(12) United States Patent
Smith et al.

(10) Patent No.: US 6,487,522 B1
(45) Date of Patent: Nov. 26, 2002

(54) SYSTEM AND METHOD FOR SELECTIVELY EXECUTING A COMPUTER PROGRAM BASED ON THE PRESENCE OF ASSOCIATED HARDWARE

(75) Inventors: T. Gavin Smith, Pflugerville; Gaston M. Barajas, Austin, both of TX (US)

(73) Assignee: Dell Products, L.P., Round Rock, TX (US)

( * ) Notice: Subject to any disclaimer, the term of this patent is extended or adjusted under 35 U.S.C. 154(b) by 110 days.

(21) Appl. No.: 09/704,128

(22) Filed: Nov. 1, 2000

(51) Int. Cl.[7] .................................................. G06F 7/00
(52) U.S. Cl. ........................ 702/186; 702/122; 702/123
(58) Field of Search ............................... 702/122, 123, 702/186; 712/1; 173/1, 2

(56) References Cited

U.S. PATENT DOCUMENTS

| | | | |
|---|---|---|---|
| 5,896,534 A | 4/1999 | Pearce et al. ................ 395/680 |
| 5,963,743 A | 10/1999 | Amberg et al. .............. 395/712 |
| 5,991,543 A | * 11/1999 | Amberg et al. .............. 395/712 |
| 5,995,757 A | 11/1999 | Amberg et al. .............. 395/712 |
| 6,038,399 A | * 3/2000 | Fisher et al. ................. 395/712 |
| 6,182,275 B1 | * 1/2001 | Beelitz et al. ................... 717/1 |
| 6,353,928 B1 | * 3/2002 | Altberg et al. ................ 717/11 |

* cited by examiner

Primary Examiner—Marc S. Hoff
Assistant Examiner—Felix Suarez
(74) Attorney, Agent, or Firm—Haynes and Boone, LLP

(57) ABSTRACT

A computer system includes a processor; a hard drive connected to the processor and having an image applied thereto, the image including device drivers and executable applications; an installation file stored on the hard drive and executable by the processor, the installation file including a first instruction associated with a first executable application; and a data file stored on the hard drive; wherein upon execution of the first instruction by the processor, a determination is made whether the data file includes a valid section corresponding to the first executable application and including a list of hardware devices that are compatible with the first executable application.

27 Claims, 2 Drawing Sheets

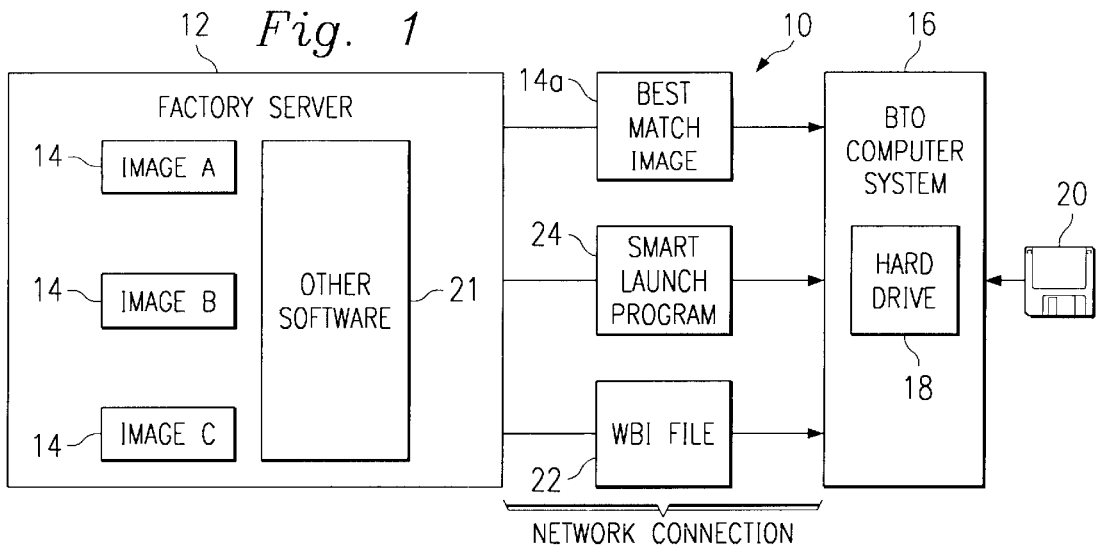

Tasks to Execute Automatically During Factory-Install:

306a — SmartLaunch.exe  PnPSection=5478U  exec=c:\dell\applets\soundblaster.exe-quiet
306b — SmartLaunch.exe  PnpSection=25714  exec=c:\dell\applets\crystalaudio.exe-s
306c — SmartLaunch.exe  PnPSection=161VC  exec=c:\dell\applets\turtlebeachsound.exe-q
300 — etc...

SmartLaunch.ini:

308a { [5478U.Valid] *(Valid components have matching PnP IDs)* ~310a
PCI\VEN_08DE&DEV_0020&SUBSYS_05357413 ~312a 308b { [5478U.Valid] *(Invalid components have matching PnP IDs)* ~310b
PCI\VEN_84DE&DEV_0014&SUBSYS_05501092 ~312b 308c { [25714.Valid] ~310c
PCI\VEN_10DE&DEV_0020&SUBSYS_06574616
PCI\VEN_10DE&DEV_0020&SUBSYS_06574617  }312c
PCI\VEN_10DE&DEV_0020&SUBSYS_06574618

308d { [161VC.Valid] ~310d
PCI\VEN_24DE&DEV_0020&SUBSYS_08465115 ~312d

302 — etc...

Matching PnP ID Found!
(install crystalaudio.exe)

Installed Hardware Devices and PnP IDs:

| | |
|---|---|
| NVidia 16mb video card | (PCI\VEN_21DE&DEV_0022&SUBSYS_81657264) |
| Crystal Audio sound card | (PCI\VEN_10DE&DEV_0020&SUBSYS_06574618) |
| 3Com 905C network card | (PCI\VEN_12DE&DEV_0034&SUBSYS_71511357) |
| etc... | |

304

SYSTEM AND METHOD FOR SELECTIVELY EXECUTING A COMPUTER PROGRAM BASED ON THE PRESENCE OF ASSOCIATED HARDWARE

BACKGROUND

The disclosures herein relate generally to computer systems and more particularly to a system and method for selectively executing a computer program based on the presence of associated hardware.

A build-to-order ("BTO") computer manufacturing environment typically includes a factory server having stored thereon a variety of software applications and drivers to be installed on BTO computer systems before they are shipped to end-users. In particular, once a computer system is assembled, during a software-download stage of the manufacturing process, software is downloaded from the server to the system as required based on the hardware and software configuration ordered by the end-user as specified in a file ("system descriptor record") associated with the system. The appropriate software, including, for example, operating system ("OS"), applications, and hardware device drivers, is subsequently installed on the computer system before it is shipped to the end-user.

Previously, the installation process was performed by the end user and would take 30 to 45 minutes to complete. More recently, at least one computer manufacturer has implemented a Windows-based installation ("WBI") process during which, upon completion of the software download process, the computer system is booted into Windows and the appropriate applications and device drivers are installed. The installation process is controlled by a "WBI File," which includes a list of steps that are to be performed once the computer system has been rebooted to Windows.

Hardware device drivers are usually plug-and-play ("PnP") compatible, meaning they will install on a computer system on which they are preloaded only if the associated hardware is detected by the operating system. Many drivers have associated therewith "driver applets," which are typically small applications that work in conjunction with the driver. For example, a driver applet may provide a GUI to allow the user to change certain device settings. Driver applets most often do not utilize PnP detection. This poses a problem, especially in an automated computer manufacturing environment, because there must exist a process external to each available driver applet, for determining whether or not it should be installed on a given computer system or hardware configuration. Such an external process can be difficult and expensive to maintain.

In a non-imaging BTO manufacturing environment, each driver applet is a standalone package that can be tied in an order-entry system to its associated hardware device(s). When a hardware device is ordered, a process is initiated that results in the installation of the driver applet on the customer's computer.

Recently, at least one BTO computer manufacturer has been experimenting with imaging a block of software onto the hard drive. Imaging poses a problem in the case of a BTO manufacturer in that it is impractical to maintain a separate image for each and every possible hardware/software configuration that may be ordered. Some manufacturers have solved this problem by limiting the number of available configurations. This solution is not acceptable to a manufacturer that truly wants to provide BTO systems.

Another solution, and one that is more attractive to the latter manufacturer, is to maintain several sets of "base" images that include software that does not change from system-to-system (e.g., an operating system) and then layer additional software on top of that. Software that typically does change is the driver set for each computer. For example, a first system ("System A") may support video cards A1 and A2 while a second system ("System B") supports video cards B1 and B2. Because, as explained above, most drivers are PnP compatible, the drivers for all of the video cards (A1, A2, B1, and B2) can be included on an image applied to the hard drives of both System A and System B and only the appropriate drivers will install on each.

As described above, many drivers have associated therewith driver applets, which are not typically PnP compatible. So, while a device driver can rely on a mechanism internal to the OS, namely, PnP hardware detection, the same is not true for driver applets, which rely on some mechanism external to the OS for determining whether or not the applet is to be installed.

Accordingly, in an imaging environment, if the PnP driver files for a first set of computer systems A, B, C, and D are included on an image, which image is then copied to the hard drives of each of systems A, B, C, and D, the drivers will only install on the appropriate systems; i.e., those systems on which the corresponding hardware is detected. However, if non-PnP driver applets for each of systems A, B, C, and D are included on the image, there must be some way to ensure that they install appropriately; i.e., only on those systems in which corresponding hardware is present.

In an imaging environment, driver applets are bundled together in the order-entry system and therefore are not associated with their hardware device(s) on a one-to-one basis. As a result, the ordering of a driver applet does not necessarily equate to the need to install it. This means that the instructions to install the driver applet must include a check for the associated hardware device(s) in that order. Without PnP detection, this requires an arbitrary key to be used signifying that a specific hardware device was ordered. Such a key becomes a maintenance point and a source for potential problems in the future.

Another alternative is to have the instructions to install a driver applet tied to the hardware device, while the driver applet itself is imaged. In this manner, the instructions are only executed if the hardware device is ordered. Depending on the reasons for imaging the driver applets, this may be a viable alterative; however, this too becomes a maintenance point and a source for potential problems in the future.

Yet another alternative is to require vendors to equip all driver applets with PnP detection. This is an enormous endeavor that would be met with much resistance because concerns other than those of a BTO computer manufacturer are involved. For example, many vendors do not perform PnP detection because they want their driver applet to install regardless of whether the associated hardware is present in the system.

Therefore, what is needed is a system and method for selectively installing a driver applet residing on the hard drive of a computer based on the detection of associated hardware.

SUMMARY

One embodiment accordingly, provides for selectively installing executable applications on a computer hard drive. The computer is associated with an installation file and a first data file. The computer executes the installation file. Upon encountering in the installation file a first instruction associated with a first executable application, it is determined whether the first data file includes a valid section corresponding to the first executable application and comprising a list of hardware devices that are compatible with the first executable application. In response to a determination that the first data file includes corresponding valid section, it is determined whether any one of the hardware devices listed in the corresponding valid section is installed on the computer. Further, in response to a determination that any one of the hardware devices listed in the corresponding valid section is installed on the computer, the first executable application is installed in the hard drive.

A principal advantage of this embodiment is that the driver applets for a set of different computer system hardware configurations can be included on a single image downloaded to each computer system of that set and will only install on computer systems having the appropriate hardware configuration.

BRIEF DESCRIPTION OF THE DRAWINGS

FIG. 1 is a system block diagram of a BTO manufacturing environment for implementing one embodiment.

FIG. 3 illustrates various files used in implementing the embodiment of FIG. 1.

DETAILED DESCRIPTION

Figure 2:
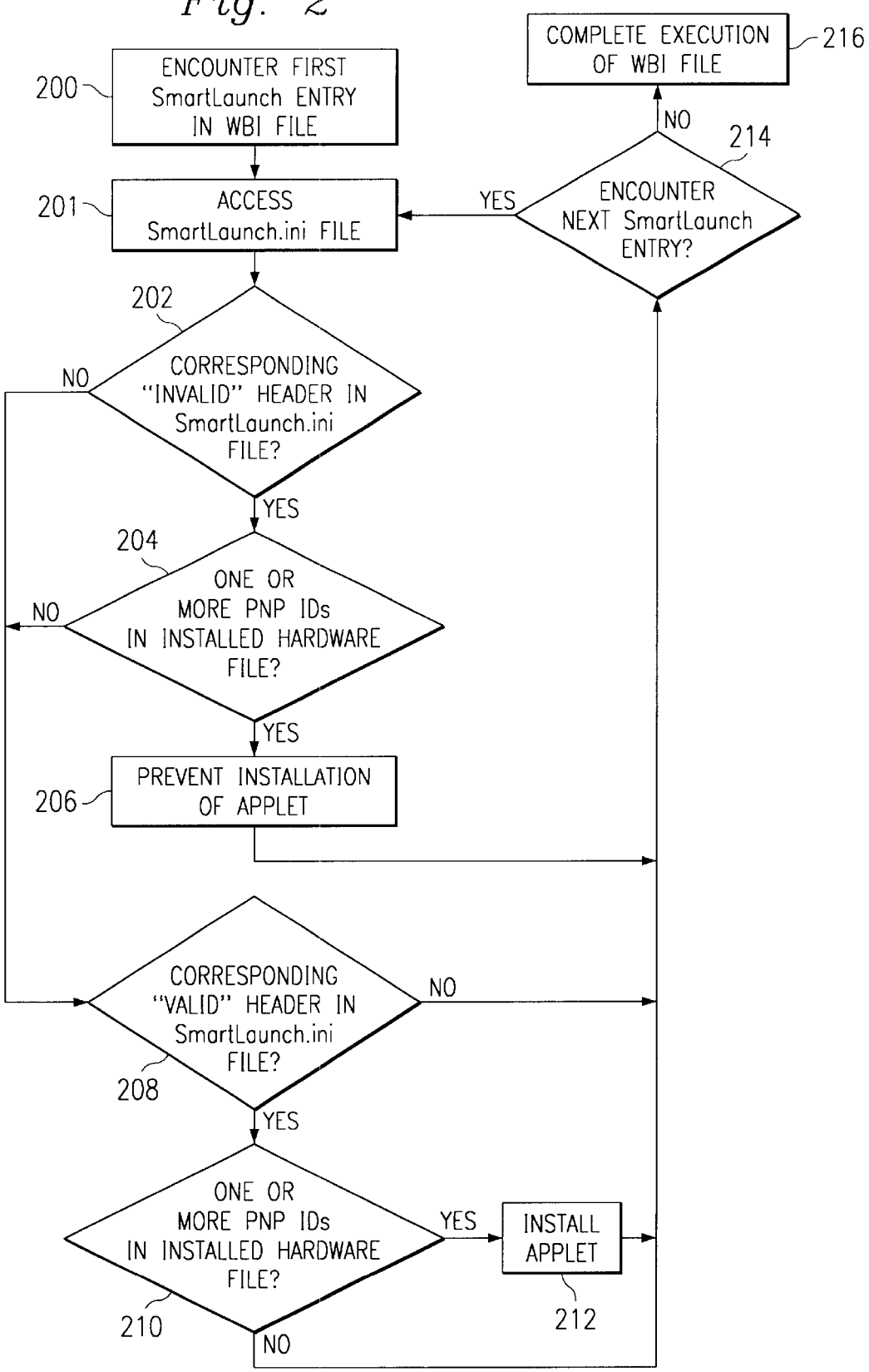
FIG. 2 is a flowchart of the embodiment of FIG. 1.

FIG. 1 is an illustration of a BTO manufacturing environment for implementing an embodiment described herein. The environment 10 includes a factory server 12 having stored thereon a plurality of images 14 for application to the hard drive of build-to-order ("BTO") computer systems, represented in FIG. 1 by a computer system 16 having a hard drive 18 and at least one processor 19 for executing software instructions in a conventional fashion. Each of the images 14 may include, for example, a Windows OS with Office 2000 installed on it with drivers and applets in a directory on the image waiting to be installed or deleted. In a preferred embodiment, one of the images 14 may be optimized for application to the hard drive of a notebook computer, while other ones of the images may respectively be optimized for application to the hard drives of various subsets of desktop computers, wherein certain predefined hardware configuration commonalities are shared by the desktop computer within each subset.

In operation, when an end-user orders a computer system, in this case, the computer system 16, he or she indicates what hardware and software configuration is desired. Once the order is generated, the order information is stored as a file on a diskette 20 that remains associated with the computer system 16 throughout the assembly process. Once the computer system 16 is connected to the factory server 12, the diskette 20 is inserted into a floppy disk drive of the computer system and is used to drive the factory installation process for that particular system.

During a factory installation phase, the factory server 12 provides the computer system 16 with a set of instructions over a network connection to build the computer to specification. In particular, a "best match" image 14a is selected from the set of images 14. The best match image 14a is applied to the hard drive 18. As previously indicated, the image may contain Windows 98 with Office 2000 installed on it with drivers and applets in a directory on the image waiting to be installed or deleted. Once the best match image 14a is applied to the hard drive 18, a layering process will take place during which other software 21 stored on the factory server 12 that is not included in the best match image 14a but that was ordered by the end-user will be downloaded from the server 12 to the hard drive 18.

Also downloaded to the hard drive 18 is a Windows-based install ("WBI") file 22 and a SmartLaunch program 24 for the system 16. Operation of the SmartLaunch program 24 will be described in detail with reference to FIG. 2. After all of the software has been downloaded, including the best match image 14a and additional software ordered but not included in the image, the WBI file 22 for the computer system 16 begins executing thereon. The WBI file 22 is executed in batch mode, from top to bottom.

More particularly, the WBI file 22 is dynamically generated on the factory server 12 during the software download process. Specifically, as the factory-install scripts for the imaged or layered software packages are executed, the appropriate entries are created in the WBI file 22. When the software download process is completed and the system boots into Windows, execution by the computer system 16 of the WBI file 22 begins. The WBI file 22 is basically a list of tasks to be performed in sequential order, as listed in the file. As each task completes successfully, the next task is performed. If a task returns an unexpected error, an entry is made to an error log (not shown) and the download fails.

FIG. 2 is a flowchart of the operation of the SmartLaunch program 24 and will be described below with additional reference to FIG. 3.

FIG. 3 illustrates an exemplary WBI file 300, an exemplary SmartLaunch.ini file 302, and an exemplary installed hardware file 304 listing the devices that are actually installed on the system 16. In one embodiment, the file 304 may be the Windows Registry. As illustrated in FIG. 3, the WBI file 200 includes a plurality of SmartLaunch.exe entries, represented in FIG. 3 by entries 306a–306c, each of which associates a PnP section number with an executable application, such as a driver applet. For example, the first SmartLaunch.exe entry 306a associates a PnP section number 5478U with an executable application designated soundblaster.exe." The second SmartLaunch.exe entry 306b associates a PnP section number 25714 with an executable application designated "crystalaudio.exe". The SmartLaunch.ini file 302 includes a plurality of sections, represented in FIG. 3 by sections 308a–308d. Each of the sections 308a–308d includes a header 310a–310d, respectively, and a body 312a–312d, respectively. The body 312a–312d of each section 308a–308d consists of a list of PnP IDs, while the respective header 310a–310d consists of a PnP section number associated with an executable application by the WBI file 22 and an indication of whether the hardware components identified by the PnP IDs listed in the body are compatible with the executable application associated with the PnP section number (header "[[PNP section number] .Valid]") or are not compatible with the executable application associated with the PnP section number (header "[[PNP section number].invalid]").

Referring again to FIG. 2, in step 200, when the first SmartLaunch entry, in this case, the entry 306a, is encountered in the WBI file 22, the SmartLaunch.ini file 302 is accessed in step 201. In step 202, a determination is made whether a section having a header containing the PnP section number identified in the SmartLaunch entry, in this case, 5478U, and designated as "Invalid" ([5478U.Invalid]) is included in the SmartLaunch.ini file 302. If so, execution proceeds to step 204, in which the installed hardware file 304 is accessed for each of the PnP IDs listed in the body 312a of the section 308a and a determination is made whether any one of the PnP IDs is enumerated therein. If so, execution proceeds to step 206, in which the associated executable application (in this case, "soundblaster.exe") is deemed to be incompatible with the driver identified by the enumerated PnP ID and is prevented from installation on the hard drive; otherwise, execution proceeds to step 208.

In the example illustrated in FIG. 3, the section 308b has the requisite header (step 202). Therefore, execution proceeds to step 204, in which it is determined that the body 312b of the section 308b includes only one PnP ID, which PnP ID is not enumerated in the file 304, so no action is necessary.

In step 208, a determination is made whether the SmartLaunch.ini file 302 includes a section having a header containing the PnP section number identified in the SmartLaunch entry, in this case, 5478U, and designated as "Valid" ([5478U.Valid]). If so, execution proceeds to step 210, in which the installed hardware file 304 is accessed for each of the PnP IDs listed in the body 312b of the section 308b and a determination is made whether any one of the PnP IDs is enumerated therein. If so, execution proceeds to step 212, in which the associated executable application (in this case, "soundblaster.exe") is installed on the hard drive.

In the example illustrated in FIG. 3, the section 308a has the requisite header (step 208). Therefore, execution proceeds to step 210, in which it is determined that the only PnP ID in the body 312a of the section 308a is not enumerated in the file 304. At this point, execution proceeds to step 208. Similarly, if in either of steps 202 or 204, a negative determination is made, execution proceeds directly to step 208. At this point, execution proceeds to step 214, in which a determination is made whether another SmartLaunch entry is encountered in the WBI file 22. If so, execution returns to step 201; otherwise, execution proceeds to step 216, in which the remainder of the WBI file is executed in typical fashion.

Still referring to the example shown in FIG. 3, on the second pass, in step 202, a determination is made whether a section having a header containing the PnP section number identified in the SmartLaunch entry, in this case, 25714, and designated as "Invalid" ([25715.Invalid]) is included in the SmartLaunch.ini file 302. In this case, there is no such section, so execution proceeds to step 208, in which a determination is made whether a section having a header [25715.Valid], is included in the SmartLaunch.ini file 302. In this case, the section 308c has the requisite header. In step 210, the installed hardware file 304 is accessed for each of the PnP IDs listed in the body 312c of the section 308c to determine whether any one of the PnP IDs is enumerated therein. If so, the associated executable application ("crystalaudio.exe") is installed in step 212.

In this case, the first two PnP IDs of the body 312c are not enumerated in the installed hardware file 304, but the last one is, so crystalaudio.exe is installed on the hard drive in step 206. Execution then returns to step 214.

It should be noted that, in an alternative embodiment in which it is not necessary to identify incompatible applets, steps 202–206 would be omitted, with execution proceeding directly from step 201 to step 208.

In the above-described manner, rather than separately installing each applet in the WBI file for a system, the images 14 can include driver applets for all systems or a set of systems. A best match image can then be preloaded onto a system, with all of the loaded applications waiting to be installed or deleted if not installed. The WBI file will contain a SmartLaunch entry associating a PnP section number with each one of the driver applets to put a "PnP" front end on the applet. Although illustrative embodiments have been shown and described, a wide range of modification change and substitution is contemplated in the foregoing disclosure and in some instances, some features of the embodiments may be employed without a corresponding use of other features. For example, in an alternative embodiment, the executable applications are hardware diagnostics programs, rather than driver applets, and the SmartLaunch program is initiated during a hardware diagnostics phase of manufacture, rather than during a software download phase. Operation of this embodiment is similar to that described above, except that, as previously mentioned, the executable applications are not driver applets to be installed on the hard drive of the computer system, but hardware diagnostics programs to be executed responsive to a determination that the hardware devices listed in the corresponding sections of the SmartLaunch file are installed on the computer system. Prior to execution thereof, the hardware diagnostics programs may reside on either the hard drive of the computer system, in which case they may be included in the best match image downloaded to the system, or on the factory server 12.

Accordingly, it is appropriate that the appended claims be construed broadly and in a manner consistent with the scope of the embodiments disclosed herein.

What is claimed is:

1. A method of selectively installing executable applications on a computer hard drive, the method comprising:

associating the computer with an installation file and a first data file;

the computer executing the installation file;

upon encountering in the installation file a first instruction associated with a first executable application, determining whether the first data file includes a valid section corresponding to the first executable application and comprising a list of hardware devices that are compatible with the first executable application;

responsive to a determination that the first data file includes the corresponding valid section, determining whether any one of the hardware devices listed in the corresponding valid section is installed on the computer; and responsive to a determination that any one of the hardware devices listed in the corresponding valid section is installed on the computer, installing the first executable application on the hard drive.

2. The method of claim 1 further comprising, prior to the determining whether the first data file includes a corresponding valid section:

determining whether the first data file includes an invalid section corresponding to the first executable application and comprising a list of hardware devices that are incompatible with the first executable application;

responsive to a determination that the first data file includes the corresponding invalid section, determining whether any one of the hardware devices listed in the corresponding invalid section is installed on the computer; and responsive to a determination that any one of the hardware devices listed in the corresponding invalid section is installed on the computer, preventing the first executable application from being installed on the hard drive.

3. The method of claim 1 wherein the list of hardware devices comprises a list of identification numbers each uniquely identifying one of the hardware devices.

4. The method of claim 1 further comprising, prior to the computer executing the installation file, applying an image to the hard drive, the image including hardware device drivers and executable applications.

5. The method of claim 1 wherein the executable applications comprise driver applets.

6. The method of claim 1 further comprising, prior to the computer executing the installation file, downloading the installation file from a factory server to the hard drive.

7. The method of claim 1 wherein the executable applications comprise hardware diagnostics programs.

8. A system for enabling the selective installation of executable applications on a computer hard drive, the computer having associated therewith an installation file and a first data file, the system comprising:

means for causing the computer to execute the installation file;

means responsive to encountering in the installation file a first instruction associated with a first executable application for determining whether the first data file includes a valid section corresponding to the first executable application and comprising a list of hardware devices that are compatible with the first executable application;

means responsive to a determination that the first data file includes the corresponding valid section for determining whether any one of the hardware devices listed in the corresponding valid section is installed on the computer; and means responsive to a determination that any one of the hardware devices listed in the corresponding valid section is installed on the computer for installing the first executable application on the hard drive.

9. The system of claim 8 further comprising:

means for determining whether the first data file includes an invalid section corresponding to the first executable application and comprising a list of hardware devices that are incompatible with the first executable application prior to the determining whether the first data file includes a corresponding valid section;

means responsive to a determination that the first data file includes the corresponding invalid section for determining whether any one of the hardware devices listed in the corresponding invalid section is installed on the computer; and means for preventing the first executable application from being installed on the hard drive responsive to a determination that any one of the hardware devices listed in the corresponding invalid section is installed on the computer.

10. The system of claim 8 wherein the list of hardware devices comprises a list of identification numbers each uniquely identifying one of the hardware devices.

11. The system of claim 8 further comprising means for applying an image to the hard drive, the image including hardware device drivers and executable applications prior to the computer executing the installation file.

12. The system of claim 8 wherein the executable applications comprise driver applets.

13. The system of claim 8 further comprising means for downloading the installation file from a factory server to the hard drive prior to the computer executing the installation file.

14. The system of claim 8 wherein the executable applications comprise hardware diagnostics programs.

15. A computer system comprising:

a processor;

a hard drive connected to the processor and having an image applied thereto, the image including device drivers and executable applications;

an installation file stored on the hard drive and executable by the processor, the installation file comprising a first instruction associated with a first executable application; and a data file stored on the hard drive;

wherein upon execution of the first instruction by the processor, a determination is made whether the data file includes a valid section corresponding to the first executable application and comprising a list of hardware devices that are compatible with the first executable application;

wherein responsive to a determination that the first data file includes the corresponding valid section, a determination is made whether any one of the hardware devices listed in the corresponding valid section is installed on the computer system; and wherein responsive to a determination that any one of the hardware devices listed in the corresponding valid section is installed on the computer, the first executable application is installed on the hard drive.

16. The computer system of claim 15 wherein, prior to the determining whether the first data file includes a corresponding valid section, a determination is made whether the first data file includes an invalid section corresponding to the first executable application and comprising a list of hardware devices that are incompatible with the first executable application.

17. The computer system of claim 16 wherein responsive to a determination that the first data file includes the corresponding invalid section, a determination is made whether any one of the hardware devices listed in the corresponding invalid section is installed on the computer.

18. The computer system of claim 17 wherein responsive to a determination that any one of the hardware devices listed in the corresponding invalid section is installed on the computer, the first executable application is prevented from being installed on the hard drive.

19. The computer system of claim 15 wherein the list of hardware devices installed on the computer comprises a list of identification numbers each uniquely identifying one of the hardware devices.

20. The computer system of claim 15 wherein the executable applications comprise driver applets.

21. The computer system of claim 15 wherein the executable applications comprise hardware diagnostics programs.

22. A method of selectively executing hardware diagnostics programs on a computer, the method comprising:

associating the computer with an installation file and a first data file;

executing the installation file;

upon encountering in the installation file a first instruction associated with a first hardware diagnostics program, determining whether the first data file includes a section corresponding to the first hardware diagnostics program and comprising a list of hardware devices;

responsive to a determination that the first data file includes the corresponding section, determining whether any one of the hardware devices listed in the corresponding section is installed on the computer; and responsive to a determination that any one of the hardware devices listed in the corresponding valid section is installed on the computer, executing the hardware diagnostics program on the computer.

23. The method of claim 22 wherein the list of hardware devices comprises a list of identification numbers each uniquely identifying one of the hardware devices.

24. A system for enabling the selective execution of hardware diagnostics programs on a computer, the computer having associated therewith an installation file and a first data file, the system comprising:

means for executing the installation file;

means responsive to encountering in the installation file a first instruction associated with a first hardware diagnostics program for determining whether the first data file includes a section corresponding to the first hardware diagnostics program and comprising a list of hardware devices;

means responsive to a determination that the first data file includes the corresponding section for determining whether any one of the hardware devices listed in the corresponding section is installed on the computer; and means responsive to a determination that any one of the hardware devices listed in the corresponding section is installed on the computer for installing the first hardware diagnostics program on the hard drive.

25. The system of claim 24 wherein the list of hardware devices comprises a list of identification numbers each uniquely identifying one of the hardware devices.

26. A computer system comprising:

a processor;

a hard drive connected to the processor;

an installation file comprising a first instruction associated with a first hardware diagnostics program; and a data file;

wherein upon execution of the first instruction by the processor, a determination is made whether the data file includes a section corresponding to the first hardware diagnostics program and comprising a list of hardware devices;

wherein responsive to a determination that the first data file includes the corresponding section, a determination is made whether any one of the hardware devices listed in the corresponding section is installed on the computer system; and wherein responsive to a determination that any one of the hardware devices listed in the corresponding section is installed on the computer, the first hardware diagnostics program is executed on the computer.

27. The computer system of claim 26 wherein the list of hardware devices installed on the computer comprises a list of identification numbers each uniquely identifying one of the hardware devices.

* * * * *